United States Patent
Kiely et al.

(10) Patent No.: US 7,314,906 B2
(45) Date of Patent: Jan. 1, 2008

(54) HIGH MOLECULAR WEIGHT STEREOREGULAR HEAD-TAIL POLY(GLUCARAMIDES)

(75) Inventors: Donald E. Kiely, Missoula, MT (US); Kylie Kramer, Missoula, MT (US)

(73) Assignee: The University of Montana, Missoula, MT (US)

( * ) Notice: Subject to any disclaimer, the term of this patent is extended or adjusted under 35 U.S.C. 154(b) by 9 days.

(21) Appl. No.: 10/734,417

(22) Filed: Dec. 10, 2003

(65) Prior Publication Data

US 2004/0143089 A1    Jul. 22, 2004

Related U.S. Application Data

(60) Provisional application No. 60/432,574, filed on Dec. 10, 2002.

(51) Int. Cl.
*C08G 69/04* (2006.01)
*C08G 69/10* (2006.01)

(52) U.S. Cl. ............. 528/335; 528/351; 528/336; 525/540; 525/928; 527/312

(58) Field of Classification Search ........ 528/335, 528/336, 351; 525/540, 926; 527/312
See application file for complete search history.

(56) References Cited

U.S. PATENT DOCUMENTS 5,329,044 A    7/1994   Kiely et al.
5,473,035 A *  12/1995  Kiely et al. ............. 527/312
5,478,374 A    12/1995  Kiely

OTHER PUBLICATIONS

L. Chen and D.E. Kiely,"Synthesis of Stereoregular Head-Tail Hydroxylated Nylons Derived from D-Glucose", J. Org. Chemistry, 61, (1996) p. 5847, Birmingham, AL, USA.
F.W. Billmeyer, Jr., "Molecular Weight and Molecular-Weight Distribution",Textbook of Polymer Science, 3rd ed., p. 274, Wiley-Interscience (1984), New York, NY, USA.
H.R. Alcock and F. W. Lampe, Contemporary Polymer Chemistry,2nd ed., Prentice-Hall, (1990), Englewood Cliffs, NJ, USA.
K. Hashimoto, M. Okada, Naomi Honjou, Ring-opening polyaddition of D-glucaro-1,4:6,3-dilactone with p-zylylenediamine, Macromol. Chem. Rapid Commun., 11, p. 393, (1990), JP.
K. Hashimoto, S. Wilbullucksanakul, M. Matsuura and M. Okada, J. Polym. Sci., Polym. Chem. Ed., 31, 3141 (1993) JP.

* cited by examiner

*Primary Examiner*—Irina S Zemel
(74) *Attorney, Agent, or Firm*—Jean Kyle

(57) ABSTRACT

A method of producing high molecular weight stereoregular head, tail-poly(alkylene D-glucaramides) is described. Amidoamino acids are esterified in cold alcohol and then polymerized in a protic solvent to form steroregular prepolymers. The prepolymers are then further polymerized by dissolving them in a solvent to form larger, purer postpolymers. Compositions of matter prepared using the subject method are also described.

15 Claims, No Drawings

HIGH MOLECULAR WEIGHT STEREOREGULAR HEAD-TAIL POLY(GLUCARAMIDES)

CROSS REFERENCE TO RELATED APPLICATIONS

This application claims priority to U.S. Provisional patent application Ser. No. 60/432,574, filed Dec. 10, 2002.

The subject invention was made with government support under a research project supported by the United State Department of Agriculture, Grant No. 2001-344463-10521. The government has certain rights in this invention.

BACKGROUND OF THE INVENTION

The reports of Kiely and Chen [1,2] describe a process for the preparation of stereoregular head, tail-poly(alkylene D-glucaramides) (a class of polyhydroxylpolyamides, PHPAs). The alkylenediamine monomer units reported contained $C_2$, $C_4$, $C_6$, $C_8$, $C_{10}$, & $C_{12}$ carbons, respectively. The reported process generates polyamides with number average molecular weights ($M_n$) of 1,200 ($C_2$), 2,100 ($C_4$), 2,440 ($C_6$), 1,600 ($C_8$), 4,400 ($C_{10}$), 3,800 ($C_{12}$), respectively. These $M_n$ values correspond to weight average molecular weights ($M_w$) of ca. 2,400-9,000, respectively. In general, the reported process does not produce polymers whose molecular weight values are high enough to classify the polymers as high polymers. As indicated by Billmeyer ([3], p. 17), "Number-average molecular weights of commercial polymers usually lie in the range of 10,000-100,000, although some materials have values of $M_N$ 10-fold higher, and others 10-fold lower. In most cases, however, the physical properties associated with typical high polymers are not well developed if $M_N$ is below about 10,000". Likewise, as stated by Billmeyer ([3], p. 4), "Most high polymers useful for plastics, rubber, or fibers have molecular weights between 10,000 and 100,000". It is clear that the molecular weight distributions of the above reported polymers are low by conventional "polymer science" wisdom. Thus, it is important that significant increases in the molecular weights of PHPAs as reported above would likely be necessary to make them useful as polymeric materials.

In order to achieve sufficiently high molecular weight condensation polymers of the type described, an essential requirement is that the (molar) stoichiometry of the appropriate reacting diacid and diamine components be 1:1. According to Allcock and Lampe, any deviation from this stoichiometry will severely limit the molecular weights of the resultant polyamides.([4], pp 274-275) The stoichiometry issue has been adequately addressed by forming an "amino acid-monoamide monomer",[1,2,5] a stereospecific monomer with the C-6 of the glucaryl unit in an amide bond with one of the amine functions from a primary diamine. The termini of this monomer were the C-1 carboxyl group (esterified) of the glucaryl unit and the remaining terminal primary amine unit of the starting diamine, respectively. A second factor that is essential in creating high polymers in a solution condensation polymerization in which the polymer precipitates from solution, is that the polymer formed must first reach a sufficiently high molecular weight before it precipitates from solution. In the above, the polymerizations were carried out in methanol solution, and the product polymers isolated by filtration.[1,2] Consequently, the size of the polymers that were produced were limited by their solubility in methanol solution and have low reported molecular weights as indicated above.

Using solvents that keep growing polymers in solution longer than is the case with methanol, or other simple protic solvents, should produce higher molecular weight polyamides directly. Polymerization is dimethylsulfoxide (DMSO) is a much better solvent for dissolving polyamides than is methanol. Furthermore, DMSO has been previously reported as a solvent to make polymers derived from glucaric acid.[6,7] However, while it is clear that DMSO is a solvent for preparing PHPAs by virtue of the solubility of the starting monomers and resulting polyamides, it is not clear how well the polymerizations proceed in DMSO as compared to protic solvents such as methanol. In our hands, use of DMSO alone as a polymerization solvent is not satisfactory, i.e., most of the polyamides formed are very soluble in DMSO and product isolation is much more difficult than when methanol or another protic solvent is the reaction medium. Furthermore, in spite of the high solubility of the polyamide products in DMSO, we discovered that polymerizations are much slower in DMSO alone as solvent compared to methanol and other protic solvents. In addition higher molecular weight polymers are not produced as required.

A reasonable compromise considered was to carry out the polymerizations in a mixture of an aprotic solvent with a high dielectric constant (e.g. dimethylsulfoxide) and an alcohol (e.g., methanol). However, the predicted results were not realized and the resulting polyamide produced had only a marginally higher molecular weight and corresponding lower isolated yield than was achieved when methanol alone was used as the solvent.

Another consideration that had to be taken into account for making high molecular weight stereoregular polyamides of the type described, was avoiding reaction conditions that would break the original "amino acid-monoamide monomer" monoamide bond to give an amine and esterified carbohydrate diacid units, a condition that would lead to stereochemically random polyamides. It was discovered in our hands that following the procedure described,[2] significant alcoholysis of the monoamide bond of the starting sodium salt of the amino acid occurred, leading to esterified diacid plus diamine in mixture with the desired esterified monoamidoamino acid. Polymerization of this monomer mixture leads to significantly decreased stereoregular polymer formation. To achieve the desired higher molecular weight materials, and to reduce the possibility that the stereoregularity of the polymers was not seriously compromised, several unique adaptations to the published process had to be undertaken.

All patents, patent applications, provisional patent applications and publications referred to or cited herein, or from which a claim to benefit of priority has been made, are incorporated by reference in their entirety to the extent they are not inconsistent with the explicit teachings of the specification.

SUMMARY OF THE INVENTION

The invention involves a method of producing high molecular weight stereoregular head, tail-poly(glucaramides). Amidoamino acids are first alcohol esterified. The esterified amidoamino acids are then polymerized in a protic solvent in the presence of a tertiary amine to form stereoregularly improved prepolymers. These prepolymers are further polymerized in a mixed solvent, with or without a tertiary amine, to form stereoregular poly(glucaramides). This unique method produces new polymers having higher molecular weights than those polymers previously reported.

DESCRIPTION OF THE INVENTION

The subject invention involves a process for the preparation of significantly higher molecular weight stereoregular head, tail-poly(alkylene D-glucaramides) then previously reported.[1,2] The sodium salt of an amidoamino acid is alcohol esterified and then polymerized in a protic solvent in the presence of a tertiary amine to produce a stereoregularly improved prepolymer. The prepolymers are further polymerized in a mixed solvent to form high molecular weight head, tail-poly(glucaramides).

Stereoregularly improved prepolymers are formed by esterifying the sodium salts of an amidoamino acid. In a preferred embodiment, alcohol (methanol) esterification of the sodium salt of the amidoamino acid[5] is carried out cold, for a very brief period of time in methanolic HCl, and the esterified product in some cases is precipitated from the esterification mixture using a relatively nonpolar aprotic solvent (e.g., diethyl ether), or isolated by careful solvent removal (mild temperature and evaporation at reduced pressure). It is important that the original amido amino acid is esterified without alcoholysis of the amide bond to improve stereoregularity.

The esterified amidoamino acid is polymerized in a protic solvent (e.g., methanol) in the presence of a tertiary amine (e.g, triethylamine) and the insoluble product polymer isolated from the reaction mixture by filtration and/or centrifugation according to the basic description.[1,2] A typical polyamide product had a degree of polymerization in the same range as the previously reported polyamides.[1,2] This initial product, the "stereoregular prepolymer", is also contaminated with a number of impurities as indicated by $^1$H NMR in DMSO. These impurities are formed in the previously described procedures but were not indicated as being present.[1,2,5] However, the modified procedure as above provides a more stereoregular polymer then previously described.

The "stereoregular prepolymer" is then dissolved in various mixtures of DMSO and methanol, with or without the addition of triethylamine, and within hours a product precipitates from solution. Examination of the product, referred to as a "postpolymer", by $^1$H NMR typically indicated polymers of considerably greater size (degrees of polymerization (dp) ca. 1.5-5.2 times that of the "prepolymers" with some corresponding $M_w$ values above 10,000). The higher molecular weight polyamides produced in this way meet the previously indicated molecular weight requirements for high polymers with appropriate polymer properties, the polymers are much larger and purer than those previously reported, and the stereoregularities of the polymers are minimally compromised or not compromised, due to the mild conditions employed for the esterification step as described above.

The subject method generates esterified monamido amino acid monomers with improved stereoregularity over those monomers previously reported. High molecular weight stereoregular head, tail-poly(alkylene D-glucararnides) postpolymers are produced based on a process that involves formation of a stereoregular prepolymer, which is in turn subjected to further polymerization to produce a larger and purer postpolymer than previously described. The postpolymers, with their improved stereoregularity, are "living polymers" (with an amine and esterified acid group on each end) which are capable of even further growth in other solvent systems that might be applied. As individual prepolymers and postpolymers of the type described here are structurally different from other pre and postpolymers, their physical and chemical properties are different, thus indicating that it is reasonable to expect that different post polymerization conditions (solvent(s), temperature, time, etc.) will ultimately be required to optimize polymer size. The examples provided here, while employing a limited set of postpolymerization conditions for purposes of illustration, indicate the general success of the approach described to produce higher molecular weight polyhydroxypolyamides.

This method can utilize the following 1° diamines in making higher molecular weight polymers as described in the examples below. All available alkylenediamines (unbranched or branched), alkylenediamines with at least one heteroatom replacing a carbon of the chain, various available arylalkylenediamines, diamines with one or more quaternary ammonium atoms in place of a carbon atom in the chain, and rings with at least two pendant 1° amine groups.

The prepolymers indicated in the following examples represent new compositions of matter in that they have improved stereoregularity over those of the previously reported materials, based on the determination that the previously reported method of preparation of the esterified sodium salts of an amidoamino acid cleaved the amido bond by alcoholysis and rendered esterified glucaric acid and the alkylene derived diammonium disalts as a mixture. The postpolymer stereoregular head, tail-poly(alkylene D-glucaramides) indicated in the following examples also represent new compositions of matter, i.e., different from those reported previously in that they have improved stereoregularity derived from the stereoregularly improved prepolymers which originate from stereoregularly improved esterified amidoamino acid monomers, plus having significantly higher molecular weights than described.[1,2]

The following examples are offered to further illustrate but not limit both the compositions and the methods of the present invention. All percentages are by weight and all solvent mixture proportions are by volume unless otherwise noted. All $M_n$ values and dp values were determined using $^1$H NMR end group analysis method.[1]

Examples 1-4 describe the preparation of stereoregular head, tail-poly(alkylene D-glucaramides) prepolymers

EXAMPLE 1

Polymerization to Make Pre-polymer Head,Tail-poly(ethylene D-glucaramide).

A methanol/HCl solution was prepared with the drop-wise addition of acetyl chloride (0.50 mL, 7.3 mmol) into a flask containing methanol (4.0 mL) while stirring in an ice bath for 20 min. The sodium salt of 6-[N-(2'-aminoethyl)]-D-glucaramide[5] (0.30 g, 1.09 mmol) was added to the acidic solution, the flask was removed from the ice bath, and the reaction mixture stirred for 20 min at room temperature. The reaction mixture was transferred to a centrifuge tube and centrifuged to remove the NaCl precipitate from solution. The filtrate was concentrated under reduced pressure to give a syrup which was redissolved in fresh methanol (8.0 mL) and made basic with the drop-wise addition of triethylamine (pH paper). Additional triethylamine (0.1 mL) was added to maintain a basic pH. The solution was stirred at ambient temperature for 5 h, although a precipitate was apparent after 40 min. The solid white product was separated by centrifugation and washed with fresh methanol (2×5.0 mL). The polymer product, head, tail-poly(ethylene D-glucaramide), was dried in the vacuum desiccator (0.115 g, 0.50 mmol, 45%, dp: 3.64, $M_n$ 853, estimated $M_w$ 1,747.7).

EXAMPLE 2

Polymerization to Make Pre-polymer Head,Tail-poly(tetramethylene D-galucaramide).

A methanol/HCl solution was prepared with the drop-wise addition of acetyl chloride (1.00 mL, 13.3 mmol) into a flask containing methanol (7.0 mL) while stirring at ambient temperature in an ice bath for 20 min. The sodium salt of 6-[N-(4'-aminobutyll)]-D-glucaramide$^5$ (0.70 g, 2.30 mmol) was added to the acidic solution, the flask was removed from the ice bath, and the reaction mixture stirred for 20 min at room temperature. The reaction mixture was transferred to a centrifuge tube and centrifuged to remove the NaCl precipitate from solution. Cold diethyl ether (10 mL) was added to the filtrate and a syrup precipitated out over 15 min. The syrup was separated by centrifugation and then dissolved in fresh methanol (10 mL). Triethylamine (0.70 mL ) was added drop-wise to the solution until a pH of ca. 8-9 was maintained and the solution was stirred at room temperature for 5 h. Precipitate formation was apparent after 25 min. The solid white product was separated by centrifugation and washed with fresh methanol (2×5.0 mL). The polymer product, head,tail-poly(tetramethylene-D-glucaramide), was dried in the vacuum desiccator (0.363 g, 1.41 mmol, 60%, dp: 5.07, $M_n$ 1,329, estimated $M_w$ 2,724).

EXAMPLE 3

Polymerization to Make Pre-polymer Head,Tail-poly(hexamethylene D-glucaramide).

A methanol/HCl solution was prepared with the drop-wise addition of acetyl chloride (2.25 mL, 30 mmol) into a flask containing methanol (15.0 mL) while stirring at ambient temperature in an ice bath for 20 min. The sodium salt of 6-[N-(6'-aminohexyl)]-D-glucaramide$^5$ (1.5 g, 4.5 mmol) was added to the acidic solution, the flask was removed from the ice bath, and the reaction mixture stirred for 20 min at room temperature. The reaction mixture was transferred to a centrifuge tube and centrifuged to remove the NaCl precipitate from solution. Cold diethyl ether (30 mL) was added to the filtrate and a syrup precipitated out over 10 min. The syrup was separated by centrifugation and then dissolved in fresh methanol (22.5 mL). Triethylamine (1.50 mL) was added dropwise to the solution until a pH of ca. 8-9 was maintained and the solution was stirred at room temperature for 5 h. Precipitate formation was apparent after 20 min. The solid white product was separated by centrifugation and washed with fresh methanol (2×5.0 mL). The polymer product, head,tail-poly(hexamethylene-D-glucaramide), was dried in the vacuum desiccator (0.80 g, 2.75 mmol, 60%, dp: 10.7, $M_n$ 3,106, estimated $M_w$ 6,367).

EXAMPLE 4

Polymerization to Make Pre-polymer Head,Tail-poly(dodecamethylene D-glucaramide).

A methanol/HCl solution was prepared with the drop-wise addition of acetyl chloride (1.20 mL, 16 mmol) into a flask containing methanol (8.0 mL) while stirring at ambient temperature in an ice bath for 20 min. The sodium salt of 6-[N-(12'-aminododecyl)]-D-glucaramide$^5$ (0.80, 1.9 mmol) was added to the acidic solution, the flask was removed from the ice bath, and the reaction mixture stirred for 20 min at room temperature. The reaction mixture was transferred to a centrifuge tube and centrifuged to remove the NaCl precipitate from solution. Cold diethyl ether (20 mL) was added to the filtrate and a syrup precipitated out over 10 min. The syrup was separated by centrifugation and then dissolved in fresh methanol (10.0 mL). Triethylamine (1.20 mL) was added dropwise to the solution until a pH of ca. 8-9 was maintained and the solution was stirred at room temperature for 6 h. Precipitate formation was apparent after 30 min. The solid white product was separated by centrifugation and washed with fresh methanol (2×5.0 mL). The polymer product, head,tail-poly(dodecamethylene-D-glucaramide, (0.32 g, 0.85 mmol, 45%, dp: 6.67, $M_n$ 2,503, estimated $M_w$ 5,133).

Examples 5-8 illustrate the preparation of stereoregular head, tail-poly(alkylene D-glucaramides) postpolymers.

EXAMPLE 5

Post-polymerization of Pre-polymer Head,Tail-poly(ethylene D-glucaramide).

The head,tail-poly(ethylene D-glucaramide) prepolymer (0.050 g, 21 mmol) was added to a flask containing warm (40° C.) dimethyl sulfoxide (0.12 mL) while stirring. Methanol (3.0 mL) was added to the solution followed by dropwise addition of triethylamine (0.10 mL) as the solution was heated gradually to 65° C. An immediate precipitate was observed. The reaction mixture was kept at 65° C. for 8 h. The reaction mixture was cooled to room temperature and the mixture centrifuged to remove solid precipitate. The precipitate was washed with fresh methanol and dried under reduced pressure. The product (0.026 g, 52%), higher molecular weight head,tail-poly(ethylene D-glucaramide) was dried in a vacuum desiccator (dp:8.0, $M_n$ 1,874, estimated $M_w$ 3,841). The product has the molecular formula $C_8H_{14}O_6N_2$.

EXAMPLE 6

Post-polymerization of Pre-polymer Head,Tail-poly(tetramethylene D-glucaramide).

The head,tail-poly(tetramethylene D-glucaramide) prepolymer (0.150 g, 0.38 mmol) was added to a flask containing warm (40° C.) dimethyl sulfoxide (0.50 mL) while stirring. The flask containing dimethyl sulfoxide and prepolymer was heated to 50° C. over 5 min to dissolve the prepolymer and then the solution heated to 65° C. over 10 more min. Methanol (1.0 mL) was added dropwise to the solution followed by dropwise addition of triethylamine (0.20 mL). An immediate precipitate was observed. After 5 min the solution became transparent. After an additional 30 min at the same temperature, methanol (3.0 mL) was added dropwise to the solution and precipitation was apparent. A white solid precipitate was formed in increasing amounts over an additional 5 h at 65° C. The reaction mixture was cooled to room temperature and the mixture centrifuged to remove the solid precipitate. The precipitate, higher molecular weight head,tail-poly(tetramethylene D-glucaramide), was washed with fresh methanol and dried under reduced pressure in a vacuum desiccator (0.93 g, 0.35 mmol, 62%, dp 30.0, $M_n$ 7,868, estimated $M_w$ 16,129). The product has the molecular formula $C_{10}H_{18}O_6N_2$.

EXAMPLE 7

Post-polymerization of Pre-polymer
Head,Tail-poly(hexamethylene D-glucaramide).

The head,tail-poly(hexamethylene D-glucaramide) pre-polymer (0.100 g, 0.34 mmol) was added to a flask containing warm (40° C.) dimethyl sulfoxide (1.0 mL) while stirring. The flask containing dimethyl sulfoxide and pre-polymer was heated to 60° C. over 10 min to aid in solubilizing the prepolymer and the solution was kept at 60° C. for 3 h. Methanol (0.35 mL) was added dropwise to the solution over a 5 min period and then triethylamine (0.10 mL) was added to ensure basicity. The reaction was heated at 60° C. for 6 h, cooled to room temperature and the mixture then centrifuged to remove the solid precipitate. The precipitate was washed with fresh methanol, then dried at reduced pressure. The product, higher molecular weight head,tail-poly(hexamethylene D-glucaramide), was dried in a vacuum desiccator (0.79 g, 0.27 mmol, 71%, dp: 42.7, $M_n$ 12,400, estimated $M_w$ 25,410). The product has the molecular formula $C_{12}H_{22}O_6N_2$.

EXAMPLE 8

Post-polymerization of Pre-polymer
Head,Tail-poly(docecamethylene D-glucaramide).

The head,tail-poly(dodecamethylene D-glucaramide) pre-polymer (0.200 g, 0.53 mmol) was added to a flask containing warm (40° C.) dimethyl sulfoxide (3.0 mL) while stirring. The flask containing dimethyl sulfoxide and pre-polymer was heated to 65° C. over 1 h to aid in solubilizing the prepolymer. Methanol (1.5 mL) followed by triethylamine (0.10 mL) was added to the solution to make it basic and the reaction mixture maintained at 65° C. for 1 h at which time additional methanol (2.0 mL) was added and the reaction mixture kept at 65° C. for 12 h. The reaction was cooled to room temperature and the mixture centrifuged to remove the solid yellow colored precipitate. The precipitate was washed with fresh methanol then dried at reduced pressure. The product, higher molecular weight head,tail-poly(dodecamethylene D-glucaramide), was dried in a vacuum desiccator (0.100 g, 0.26 mmol, 50%, dp:17.6, $M_n$ 6,590, estimated $M_w$ 16,477). The product has the molecular formula $C_{18}H_{34}O_6N_2$.

From the examples presented (Table 1), the individual prepolyamide to postpolyamide processes (for polyamides of the type described here) yield postpolyamides with significantly increased molecular weights, with at least one example (Example 7) showing both Mn and Mw values above 10,000. However, none of the examples represents an upper limit on molecular weight, given that further postpolymerization is possible for each of the postpolyamides as other specific postpolymerization processes are developed.

TABLE 1

Molecular weight increase in polyamides using the process described

| (diamine units) | Mn reported[1,2] | Mn here | Mw | Mn here/ Mn reported |
|---|---|---|---|---|
| $C_2$ | 1,200 | 1,870 | 3,700 | 1.56 |
| $C_4$ | 2,100 | 7,870 | 16,000 | 3.74 |
| $C_6$ | 2,440 | 12,400 | 25,400 | 5.16 |
| $C_{12}$ | 3,800 | 6,590 | 13,500 | 1.73 |

These are estimated lower end values based on ca. 2 × Mn values.

It should be understood that the examples and embodiments described herein are for illustrative purposes only and that various modifications or changes in light thereof will be suggested to persons skilled in the art and are to be included within the spirit and purview of this application and the scope of any appended claims.

REFERENCES

1. L. Chen and D. E. Kiely, "Synthesis of Stereoregular Head,Tail-Hydroxylated Nylons Derived from D-Glucose", J. Org. Chem., 61, 5847 (1996).
2. D. E. Kiely and L. Chen, U.S. Pat. No. 5,473,035, Issued Dec. 5, 1995, "Process for Preparing Poly(Glucaramides).
3. F. W. Billmeyer, Jr., "Textbook of Polymer Science", 3rd ed., 1984 Wiley-Interscience, New York, N.Y.
4. H. R. Allcock and F. W. Lampe, "Contemporary Polymer Chemistry", $2^{nd}$ ed., 1990, Prentice Hall, Englewood Cliffs, N. J.
5. D. E. Kiely and L. Chen, U.S. Pat. No. 5,329,044, Issued Jul. 12, 1994, "Glucaric Acid Monoamides and Their Use to Prepare Poly(Glucaramides)".
6. K. Hashimoto, M. Okada, Naomi Honjou, Macromol. Chem. Rapid Commun, 11, 393 (1990).
7. K. Hashimoto, S. Wibullucksanakul, M. Mausuura and M. Okada, J Polym. Sci., Polym. Chem. Ed., 31,3141 (1993).

The invention claimed is:

1. A method of producing a stereoregular head, tail-poly (alkylene D-glucaramide) postpolymer, the method comprising the steps of:
    a) esterifying an amidoamino acid in an alcohol, wherein the amidoamino acid is derived from D-glucaric acid and an alkylene diamine, the amide bond between C-6 of the glucaryl unit and one nitrogen from one of the amine units of the alkylene diamine. the amidoamino acid having a single amine unit at the alkylene terminus and a carboxylic acid unit at the C-1, D-glucaryl terminus;
    b) polymerizing the esterified amidoamino acid in a protic solvent in the presence of a tertiary amine to form a stereoregular prepolymer; and
    c) polymerizing the stereoregular prepolymer in a solvent that is different from the solvent of step b) to form the stereoregular head, tail-poly(alkylene D-glucaramide) postpolymer.

2. The method of claim 1, wherein said alcohol is selected from the group consisting of methanol, ethanol, propanol and isopropanol containing a strong acid.

3. The method of claim 1, wherein said method further comprises the step of, after a), isolating said esterified amidoamino acid by solvent removal under mild conditions.

4. The method of claim 1, wherein said amidoamino acid is selected from the group consisting of 6-[N-(2'-aminoethyl)]-D-glucaramide and salts thereof, 6-[N-(4'-aminobutyl)]-D-glucaramide and salts thereof, 6-[N-(6'-aminohexyl)]-D-glucaramide, and salts thereof, and 6-[N-(12'-aminododecyl)]D-glucaramide, and salts thereof.

5. The method of claim 1, wherein said protic solvent of step 1b) is selected from the group consisting of methanol, ethanol, propanol, and isopropanol.

6. The method of claim 1, wherein said solvent of step 1c) is a mixture of at least one protic polar solvent and, at least one aprotic polar solvent.

7. The method of claim 1, wherein said stereoregular prepolymer is polymerized in a solvent in the presence of a tertiary amine.

8. A product produced by the method of claim 1, wherein said amidoamino acid is a sodium salt of 6-[N-(2'-aminoethyl)]-D-glucaramide.

9. A product produced by the method of claim 1, wherein said amidoamino acid is a sodium salt of 6-[N-(4'-aminobutyl)]-D-glucaramide.

10. A product produced by the method of claim 1, wherein said amidoamino acid is a sodium salt of 6-[N-(6'-aminohexyl)]-D-glucaramide.

11. A product produced by the method of claim 1, wherein said amidoamino acid is a sodium salt of 6-[N-(12'-aminododecyl)]-D-glucaramide.

12. A product produced by the method of claim 1, wherein said amidoamino acid is a sodium salt of 6-[N-(2'-aminoethyl)]-D-glucaramide and said stereoregular head,tail-poly(alkylene D-glucaramide) postpolymer has a repeating unit $C_8H_{14}O_6N_2$, a degree of polymerization of about 8.0, an average molecular weight of about 1,874 and an estimated molecular weight of about 3,841.

13. A stereoregular head, tail-poly(alkylene D-glucaramide) postpolymer produced by a method comprising the steps of:
   a) esterifying an 6-[N-(4'-aminobutyl)]-D-glucaramide in an alcohol;
   b) polymerizing the esterified 6-[N-(4'-aminobutyl)]-D-glucaramide in a protic solvent in the presence of a tertiary amine to form a stereoregular prepolymer; and
   c) polymerizing the stereoregular prepolymer in a solvent that is different from the solvent in step b) to form the stereoregular head, tail-poly(alkylene D-glucaramide) postpolymer;
   wherein said stereoregular head,tail-poly(alkylene D-glucaramide) postpolymer has a repeating unit $C_{10}H_{18}O_6N_2$, a degree of polymerization of about 30.0, a number average molecular weight of about 7,868 and an estimated weight average molecular weight of about 16,129.

14. A stereoregular head, tail-poly(alkylene D-glucaramide) postpolymer produced by a method comprising the steps of:
   a) esterifying an 6-[N-(6'-aminohexyl)]-D-glucaramide in an alcohol;
   b) polymerizing the esterified 6-[N-(6'-aminohexyl)]-D-glucaramide in a protic solvent in the presence of a tertiary amine to form a stereoregular prepolymer; and
   c) polymerizing the stereoregular prepolymer in a solvent that is different from the solvent in step b) to form the stereoregular head, tail-poly(alkylene D-glucaramide) postpolymer;
   wherein said stereoregular head,tail-poly(alkylene D-glucaramide) postpolymer has a repeating unit $C_{12}H_{22}O_6N_2$, a degree of polymerization of about 42.7, a number average molecular weight of about 12,400 and an estimated weight average molecular weight of about 25,410.

15. A stereoregular head, tail-poly(alkylene D-glucaramide) postpolymer produced by a method comprising the steps of:
   a) esterifying an 6-[N-(12'-aminododecyl)]-D-glucaramide in an alcohol;
   b) polymerizing the esterified 6-[N-(12'-aminododecyl)]-D-glucaramide in a protic solvent in the presence of a tertiary amine to form a stereoregular prepolymer; and
   c) polymerizing the stereoregular prepolymer in a solvent that is different from the solvent in step b) to form the stereoregular head, tail-poly(alkylene D-glucaramide) postpolymer;
   wherein said stereoregular head, tail-poly(alkylene D-glucaramide) postpolymer has a repeating unit $C_{18}H_{34}O_6N_2$, a degree of polymerization of about 17.6, a number average molecular weight of about 6,590 and an estimated weight average molecular weight of about 16,477.

* * * * *